United States Patent
Fürst et al.

(10) Patent No.: US 10,313,048 B1
(45) Date of Patent: Jun. 4, 2019

(54) METHOD AND SYSTEM FOR ESTABLISHING AT LEAST TWO BIDIRECTIONAL COMMUNICATION LINKS USING COHERENT DETECTION

(71) Applicant: ADVA Optical Networking SE, Meiningen (DE)

(72) Inventors: Cornelius Fürst, Fuerstenfeldbruck (DE); Thomas Richter, Atlanta, GA (US); Sorin Tibuleac, Johns Creek, GA (US)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 15/816,494

(22) Filed: Nov. 17, 2017

(51) Int. Cl.
| | |
|---|---|
| H04J 14/02 | (2006.01) |
| H04B 10/40 | (2013.01) |
| H04Q 11/00 | (2006.01) |
| H04L 12/707 | (2013.01) |
| H04B 10/61 | (2013.01) |

(52) U.S. Cl.
CPC .......... *H04J 14/0294* (2013.01); *H04B 10/40* (2013.01); *H04B 10/615* (2013.01); *H04L 45/24* (2013.01); *H04Q 11/0005* (2013.01); *H04Q 2011/0015* (2013.01); *H04Q 2011/0016* (2013.01); *H04Q 2011/0032* (2013.01); *H04Q 2011/0081* (2013.01)

(58) Field of Classification Search
CPC ... H04J 14/0294; H04B 10/615; H04B 10/40; H04L 45/24; H04Q 11/0005; H04Q 2011/0032; H04Q 2011/0016; H04Q 2011/0015; H04Q 2011/0081

USPC .......................................................... 398/49
See application file for complete search history.

(56) References Cited

U.S. PATENT DOCUMENTS

| | | | |
|---|---|---|---|
| 10,078,232 B1* | 9/2018 | Vermeulen | G02F 1/011 |
| 2015/0333835 A1* | 11/2015 | Matsukawa | H04B 10/60 398/48 |
| 2016/0065314 A1* | 3/2016 | Nazarathy | H04B 10/6151 398/202 |
| 2017/0195062 A1* | 7/2017 | Evans | H01S 5/02453 |

OTHER PUBLICATIONS

Doerr, C., et al."Single-Chip Silicon Photonics 100-Gb/s Coherent Transceiver", Optical Fiber Communications Conference and Exhibition (OFC), 2014.

* cited by examiner

*Primary Examiner* — Juan A Torres
(74) *Attorney, Agent, or Firm* — The Webb Law Firm

(57) ABSTRACT

A method for establishing bidirectional communication links includes: supplying, to at least two optical transceiver modules at each side of at least two optical paths, a multiplexed optical CW signal comprising at least two optical CW signals having the same differing wavelengths, and modulating the multiplexed optical CW signal according to modulation signals; creating, at each side of the optical paths, at least two first and second optical transmit signals by optically filtering the modulated optical signals so that only a single wavelength remains, and routing pairs of a first and second optical transmit signal to the optical paths, wherein the optical transmit signals of each pair have differing wavelengths and wherein the optical transmit signals transmitted in the same direction over the same optical paths have differing wavelengths; receiving each optical transmit signal at a dedicated optical transceiver module by mixing it with the multiplexed optical CW signal.

20 Claims, 5 Drawing Sheets

METHOD AND SYSTEM FOR ESTABLISHING AT LEAST TWO BIDIRECTIONAL COMMUNICATION LINKS USING COHERENT DETECTION

FIELD OF THE INVENTION

The invention relates to a method and a system for establishing at least two bidirectional communication links using coherent detection supporting single-fiber working of at least two optical paths. Further, the invention relates to a multiple optical transceiver device that is suitable for implementing this method and realizing such a system.

BACKGROUND

Optical transmission systems using coherent detection have mainly been deployed in long-haul networks in order to realize high speed transmission. However, coherent technology is now starting to be deployed in Metro networks in order to cope with the requirement of increasing transmission capacity. The main impediments for such applications have been the cost and footprint of the optical coherent transceivers, which usually consist of a tunable laser, an advanced format modulator, a coherent optical receiver, and a digital-signal processor (DSP). Optical integration techniques, such as the silicon-on-insulator technology (SOI), are widely used to reduce cost and minimize the size of an optical assembly in the form of a photonic integrated circuit (PIC) that comprises the optical modulator and the coherent optical receiver.

C. Doerr et al. "Single-Chip Silicon Photonics 100-Gb/s Coherent Transceiver", Optical Fiber Communications Conference and Exhibition (OFC), 2014 describes a PIC integrating a full coherent receiver and a full advanced format modulator. The PIC contains all major optical functions needed for an optical coherent transceiver except the laser. The PIC comprises three fiber-optic interfaces (ports) for connecting two standard single-mode fibers and a polarization maintaining fiber. The PIC operates as follows: The optical power of a (tunable) continuous-wave (CW) laser enters one of the optical ports which is connected by an optical 1×2 power splitter to an input port of the advanced format modulator and a local oscillator input port of the coherent optical receiver. One half of the laser power is supplied to the coherent optical receiver and the other half to the optical modulator. A modulated optical transmit signal is output at another one of the three PIC ports that is connected to an output port of the integrated optical modulator. The optical signal to be received is supplied to the third PIC port which is connected to a receiving port of the integrated coherent optical receiver As the CW laser is used for both the creation of an optical transmit signal, which uses the CW signal as an optical carrier that is modulated according to an (electrical) transmit signal, and as an optical local oscillator signal for the coherent detection of the optical signal to be received, this type of an optical transceiver PIC requires that the optical signal to be received has the same wavelength (in case of homodyne detection) or approximately the same wavelength (in case of intradyne detection) as the optical transmit signal. Such transceivers are usually deployed to realize bidirectional communication by using two separate optical paths (designated as dual-fiber working if the optical path is realized by one or more optical fibers) for the respective optical transmit signal and optical signal to be received. In this way, in-band distortions due to reflections (e.g. reflections at connector interfaces or reflections caused by Rayleigh scattering) are avoided. Of course, a single optical path may be used for transmitting the signals of both directions (designated as single-fiber working if the optical path is realized by one or more optical fibers) in order to save installation cost or cost for leasing the transmission path. However, additional optical components are required in this case in order to separate the transmission paths of the optical signals at both sides of the single optical path, e.g. optical circulators, or filters, which reduces the cost saving effect. Moreover, as already mentioned, in-band distortions limit the maximum transmission length of such a single-fiber working transmission system.

For this reason, optical transmission systems using single-fiber working, i.e. using a single optical path for the optical transmit signals in both directions, generally use differing wavelengths for the optical transmit signals. If conventional coherent optical transceivers are used, it is possible to connect separate lasers having differing wavelengths to the optical modulator and the coherent optical receiver, respectively.

If integrated optical transceiver modules, e.g. PICs as described above, which integrate an optical modulator and a coherent optical receiver in a single module that provides only a single port for connecting a CW laser, shall be used in order to realize an optical transmission that supports single-fiber working, two such integrated optical transceiver modules would be required. In one of the modules only the modulator would be used in order to create an optical transmit signal at a first wavelength and in the other module only the coherent optical receiver would be used for receiving the optical signal to be received that has a differing wavelength. Of course, such an application requires two CW lasers having correspondingly differing wavelengths. The remaining parts of the two optical transceiver modules would be unused.

It is further state of the art to realize a bidirectional optical transmission system using coherent detection that supports dual-fiber working by deploying two integrated optical transceiver modules as described above at each side of the optical paths. Two CW lasers having differing wavelengths are used at each side of the optical paths, wherein the two lasers at each side have the same or essentially the same wavelength. Each of the two optical CW signals is supplied to another one of the optical transceiver modules. In this way, two optical transmit signals are created at each side of the optical paths each having a different wavelength. Each of the dual optical transceiver devices comprises an optical path separating device, e.g. an arrayed waveguide grating, that is configured to route each of the two optical transmit signals to a selected one of the two optical paths. In this transmission system, one of the optical paths is used to transmit both of the optical transmit signals in one direction and the other one of the optical paths is used to transmit both of the optical transmit signals in the other direction. Each of the optical transmit signals to be received at the respective opposite side is supplied to the receiving port of the optical transceiver module which uses the CW signal having the same or essentially the same wavelength as a local oscillator signal in order to carry out the coherent detection.

GENERAL DESCRIPTION

It is an object of the present invention to provide a method for establishing at least two bidirectional communication links using coherent detection using standard optical transceiver modules, which integrate an optical modulator and a coherent optical receiver, and which provide only a single port for connecting an optical CW source, wherein each pair of optical transmit signals which are used to establish a bidirectional communication link are transmitted over the same optical path. It is a further object of the present invention to provide an optical transmission system which realizes this method as well as to provide a multiple optical transceiver device which is configured to be used to realize such an optical transmission system.

The method for establishing at least two bidirectional communication links using coherent detection according to the present invention comprises the steps of:

providing, at each of a first and a second side of at least a first and a second optical path, at least two optical transceiver modules, wherein each optical transceiver module comprises an optical modulator and a coherent optical receiver, each optical modulator having an input port, a modulation port and an output port and each coherent optical receiver having a local oscillator port, a receiving port and an output port, wherein an input port of each optical transceiver module is connected by an optical 1×2 power splitter device to the optical modulator input port and the coherent optical receiver input port, creating, at each of the first and second sides of the optical paths, a multiplexed optical CW signal ($S_{CS}$) comprising at least two optical CW signals having differing wavelengths, wherein the CW signals ($S_{CW1,i}$) created at the first side and the CW signals created at the second side have the same or essentially the same wavelengths, supplying the multiplexed optical CW signal to the input port of each optical transceiver module, creating, at an output port of each optical modulator, which defines an output port of the optical transceiver module, a modulated optical signal which includes information of one or more modulation signals that are supplied to the modulation port of the corresponding optical modulator, creating, at each of the first and second sides of the optical paths, at least two first and second optical transmit signals by optically filtering each of the modulated optical signals in such a way that only a single wavelength remains, and routing each at least one pair of a dedicated first and second optical transmit signal that is used to establish the at least two bidirectional communication links to a dedicated one of the at least first and second optical paths, wherein the first and second optical transmit signals of each pair have differing wavelengths and wherein the first and second optical transmit signals that are transmitted in the same direction over the same optical paths have differing wavelengths, routing, at each of the first and second sides of the optical paths, each of the at least two first and second optical transmit signals to a receiving port of a dedicated coherent optical receiver, and creating, at the output port of each coherent optical receiver, one or more electrical receive signals by mixing the respective optical transmit signal that is supplied to the receiving port and all of the at least two (m) optical CW signals.

The core of the present invention is to provide at least two optical sources, for example tunable optical lasers, at each side of at least a first and a second optical path and to supply all optical CW signals to both the optical modulator and the coherent optical receiver by supplying all optical CW signals to an input port of each optical transceiver module, which is connected by an optical 1×2 power splitter device to the optical modulator input port and the coherent optical receiver input port. In this way, the output signal of each optical modulator or optical transceiver module, respectively, comprises the wavelengths of all optical CW sources. Likewise, each coherent optical receiver, i.e. each optical transceiver module, is capable of carrying out a coherent detection for any optical transmit signal which has been created on the respective opposite side of the optical paths and which is supplied to the respective receiving port and has a wavelength identical to or sufficiently close to the wavelength of any of the optical CW sources provided at the respective side of the optical paths.

The inventors were able to show that mixing all of the local oscillator signals and the optical transmit signal to be received has only a negligible impact on the bit error ratio (BER) versus optical signal-to-noise ratio performance (OSNR). The mixing products having high frequencies resulting from mixing local oscillator signals having different wavelengths compared to the wavelength of the optical transmit signal to be received can be eliminated (or at least reduced in such a manner that the information included in the respective optical transmit signal is detected with a bit error rate that is below a predetermined threshold) by using low-pass filter properties of the optical-to-electrical converters, e.g. photodiodes, and/or an appropriate digital signal detection algorithm realizing one or more electrical low-pass or bandpass filters.

It shall be stated here, that the term "wavelength" in connection with a CW signal created by an optical CW source, designates the center wavelength of the CW signal. Of course, the optical spectrum of a CW signal that is used for coherent optical transmission has a bandwidth that is sufficiently narrow.

The multiplexed optical CW signal can be created by using a separate optical source, e.g. a narrowband laser, for creating each of the optical CW signals. It is, however, also possible to create the multiplexed CW signal by using a single optical source, e.g. an optical comb source, which is configured to create an optical CW signal that is equivalent to superimposed optical CW signals having different wavelengths. The term "multiplexed optical CW signal" as used throughout this description merely describes an optical signal comprising an optical spectrum having discrete peaks at predetermined wavelengths or optical frequencies, respectively, irrespective of the method or components used to create such an optical signal.

It shall further be pointed out that instead of a multiplexed optical CW signal a multiplexed pulsed optical signal may be used which contains multiplexed optical pulsed signals at differing wavelengths.

As the present invention is independent of how the optical transmit signals are created, i.e. independent of a specific realization of the optical modulator, and independent of the nature of the coherent detection method applied, i.e. independent of a specific embodiment of a coherent optical receiver, it is unnecessary to describe the function of an optical modulator, especially an advanced format modulator, and the function of a coherent optical receiver in detail. Generally, any realization of an optical modulator and any realization of a coherent optical receiver may be used for the present invention.

According to an embodiment of the invention, two optical paths may be used, wherein the same number of pairs of optical transmit signals having the same wavelengths is transmitted over each optical path. In such an embodiment, all optical transceiver modules are fully used.

Further, in such an embodiment, one of the two optical paths may be used as working path and the other optical path as a protection path so that, in case of an impairment of the transmission performance or path interruption of the working path, the bidirectional communication can be switched to the protection path.

A multiple optical transceiver device according to the invention comprises:
- at least two optical transceiver modules, each comprising an optical modulator and a coherent optical receiver, each optical modulator having an input port, a modulation port and an output port and each coherent optical receiver having a local oscillator port, a receiving port and an output port, wherein an input port of each optical transceiver module is connected by an optical 1×2 power splitter device to the optical modulator input port and the coherent optical receiver input port, and
- an optical CW source which is configured to create a multiplexed optical CW signal comprising at least two optical CW signals each having a wavelength differing from the wavelengths of the other optical CW signals,
- wherein each optical modulator is configured to create, at the output port, a modulated optical signal which includes information of one or more modulation signals that are supplied to the modulation port by modulating a multiplexed optical CW signal that is supplied to its input port and comprises power portions of each of the optical CW signals, and
- wherein each coherent optical receiver is configured to create, at the output port, one or more electrical receive signals by mixing the respective optical transmit signal that is supplied to the receiving port and all of the at least two (m) optical CW signals.

Each optical transceiver module of such a multiple optical transceiver device creates a modulated optical signal which comprises the wavelengths of all optical CW signals, wherein each wavelength, which serves as an optical carrier, comprises the full information of respective one or more modulation signals. This makes it possible to select a specific wavelength for carrying out a coherent optical detection process at the receiver side. The selection is preferably effected by using an optical filter having a suitable filter characteristic, especially a narrow-band bandpass filter characteristic. The filter characteristic must be designed in such a way that only a single wavelength is extracted from the modulated optical signal, i.e. or other wavelengths must be eliminated or at least suppressed to a sufficient extent.

Of course, as explained above, it is also possible to select a specific wavelength of the modulated optical signals created by the optical modulators of the optical transceiver modules before the modulated optical signal is supplied to the respective optical path as an optical transmit signal. Such a selection is required in case more than one optical transmit signal is transmitted over the same optical path, wherein a different wavelength must be selected for each optical transmit signal that travels along the optical path in the same direction.

However, selecting a specific wavelength of each modulated optical signal before the dedicated optical path is also advantageous in case only a single pair of optical transmit signals having different wavelengths is transmitted over the same optical path as, in this case, reflections caused by one of the signals have no spectral component at the wavelength of the other optical transmit signal traveling in the opposite direction.

As mentioned above, the multiplexed optical CW signal may be created by using a separate optical source, e.g. a (fixed wavelength or tunable) CW laser, for creating the single optical CW signals and superimposing or multiplexing the optical CW signals. Of course, also an optical comb source may be used in order to directly create the multiplexed optical CW signal. Also combinations of these alternatives may be used in order to realize the optical source for creating the multiplexed optical CW signal. Further, as already described above, the CW signal may be a pulsed optical signal.

According to an embodiment of the invention, the optical source may comprise separate optical CW sources for creating each of the optical CW signals and an optical power splitter device, each output port of the optical CW sources being connected to an input port of an optical power splitter device and each output port of the optical power splitter device being connected to an input port of each optical transceiver module. In another embodiment, an optical comb source that is configured to create and output the multiplexed optical CW signal may be used.

According to an embodiment of the invention, one or more signal processing units may be provided for processing the one or more electrical data receive signals created by the at least two optical transceiver modules in order to extract the information included in the respective optical transmit signals, wherein the one or more data receive signals of each optical transceiver module are processed in such a way that signal components caused by mixing the optical transmit signal with optical CW signals having different wavelengths are eliminated or at least reduced in such a manner that the information included in the respective optical transmit signal is detected with a bit error rate that is below a predetermined threshold. Such a signal processing which is carried out on the one or more electrical receive signals created by each of the coherent optical receivers further reduces any impact of unwanted mixing products that are not yet eliminated or suppressed by the low-pass filter characteristic of the one or more optical-to-electrical converters, i.e. the photodiodes, comprised by the respective coherent optical receiver. The one or more electrical receive signals may further be processed in such a way that an (electrical or optical) data receive signal is created that includes the information detected in the respective optical transmit signal received.

Of course, a separate signal processing unit may be provided for processing the one or more electrical receive signals created by each of the at least two optical transceiver modules.

According to the invention, the multiple optical transceiver device may further comprise
- an optical path separating and filtering device, which is configured to connect the at least two optical transceiver modules to at least a first and a second optical path, the optical path separating and filtering device comprising, for each of the at least first and second optical paths, at least one pair of a first and a second separating port and a combining port, the combining port being connected to the respective optical path, the first separating port of each pair being connected to the output port of the modulator of a dedicated optical transceiver module and the second separating port of each pair being connected to the receiving port of the coherent optical receiver of a dedicated optical transceiver module,
- wherein the optical path separating and filtering device is configured to filter and route the modulated optical signals that are received at the first separation port in such a way that a corresponding optical transmit signal comprising only a single wavelength is output only at the respective combination port, wherein, in case multiple optical transmit signals are routed to the same optical path, the respective optical transmit signals have differing wavelengths, and wherein the number of optical transmit signals that are output at each combination port is equal to or less than half of the number of optical CW sources, and wherein the optical path separating and filtering device is configured to route each of the optical transmit signals that are received at the combination ports and have a wavelength equal or essentially equal to one of the wavelengths of the CW sources to a respective dedicated second separating port only.

The optical path separating and filtering device has routing as well as optical filtering properties. As each optical modulator and each coherent optical receiver have the same optical functions or properties (i.e. each optical modulator grades a modulated optical signal that comprises all wavelengths of the optical CW sources and each coherent optical receiver is capable of receiving any optical transmit signal having a selected wavelength), it is not required that the same optical transceiver module is used for creating the optical transmit signal which is assigned to a selected bidirectional communication link and receiving the optical transmit signal (created at the opposite side of the optical path) which is assigned to the same bidirectional communication link. However, doing so may simplify the assignment of data transmit signals and data receive signals to the respective optical transmit signals and optical paths, respectively.

According to a further embodiment, the optical path separating and filtering device may be configured to create a first group of optical transmit signals that are supplied to a first optical path by appropriately routing and filtering a first group of modulated optical signals created by a first group of optical transceiver modules, and a second group of optical transmit signals that are supplied to a second optical path by appropriately routing and filtering a second group of modulated optical signals created by a second group of optical transceiver modules, wherein the number of optical transmit signals that are supplied to the first optical path is equal to the number of optical transmit signals that are supplied to the second optical path and wherein the wavelengths of the first group of optical transmit signals are equal to the wavelengths of the second group of optical transmit signals. This makes it possible to use one of the optical paths as a working path and the other of the optical paths as a protection path.

In such embodiments, the multiple optical transceiver device is configured to control the optical transceiver modules (and the digital signal processing units) in such a way that, in a working mode, the first optical path and the first group of optical transmit signals are used for establishing the at least two bidirectional communication links and that, in a protection mode, the second optical path and the second group of optical transmit signals are used for establishing the at least two bidirectional communication links.

According to an embodiment of the invention, the optical path separating and filtering device may comprise an arrayed waveguide grating for each optical path, each arrayed waveguide grating having a WDM port connected to the respective optical path and at least two channel ports defining the at least one pair of a first and second separating port. Of course, a person skilled in the field of filtering and routing optical signals may design an appropriate separating and filtering device by using other optical components, e.g. narrow-band optical bandpass filters and optical multiplexers/demultiplexers. As the invention uses different wavelengths for establishing a bidirectional communication over the same optical path, no optical circulators are required in order to combine or separate the optical paths of the respective optical transmit signals. However, one could still use also circulators for the separation of the optical paths and use filters at the separated paths.

A coherent optical transmission system for establishing at least two bidirectional communication links using coherent detection according to the invention provides a multiple optical transceiver device comprising an optical path separating and filtering device at each side of at least a first and a second optical path.

BRIEF DESCRIPTION OF THE DRAWINGS

In order to facilitate a full understanding of the invention, embodiments showing how the invention may be carried out in practice will be described, by way of non-limiting examples, with reference to the accompanying drawings, in which.

DETAILED DESCRIPTION

In the following detailed description, numerous specific details are described in order to provide a thorough understanding of the invention. However, it will be understood by persons skilled in the art that the invention may be carried out without at least some of these specific details or by replacing these specific details by well-known alternatives. It shall be understood that well-known methods and components or circuits are not described in detail as these are available to those skilled in the art without any further detailed description.

Figure 1:
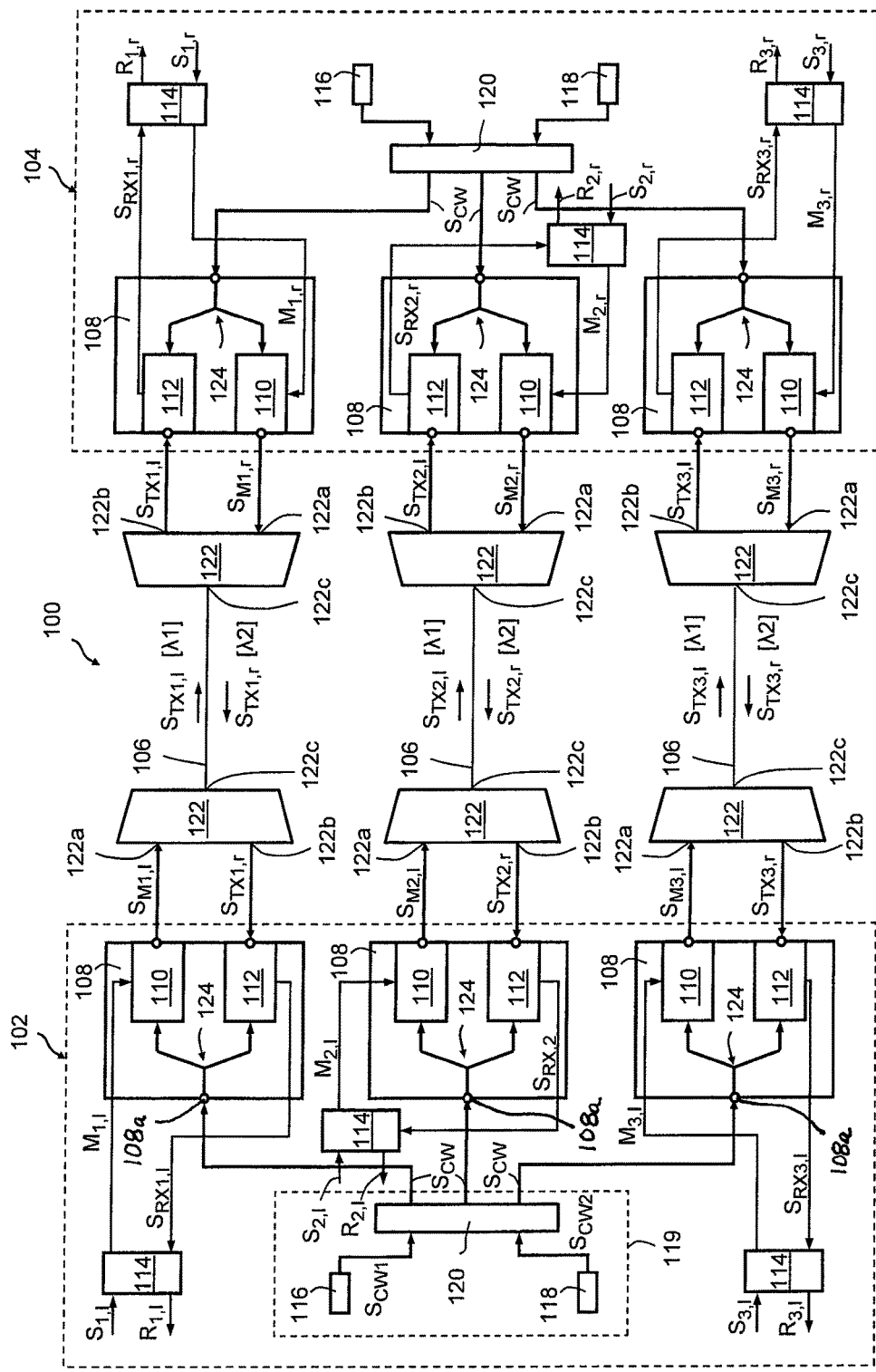
FIG. 1 shows a schematic block diagram of a first embodiment of an optical transmission system according to the invention comprising a multiple optical transceiver device comprising two optical CW sources and three optical transceiver modules at both sides of two optical paths.

FIG. 1 shows an optical transmission system 100 using coherent technology. A multiple optical transceiver device (in the embodiment shown, a triple optical transceiver device) 102, 104 is provided at both sides of three optical paths 106. Each optical path may be realized by one or more concatenated optical fibers and, as the case may be, passive optical nodes comprising optical multiplexers, demultiplexers, splitters etc. Generally, for realizing such an optical transmission system 100, single-mode optical fibers are used.

Each of the multiple optical transceiver devices 102, 104 comprises three optical transceiver modules 108, each comprising an optical modulator 110 and a coherent optical receiver 112. The optical transceiver modules 108 may be manufactured using a photonic integrated technology, e.g. SOI technology. Such a photonic integrated circuit (PIC) realizes all optical functions of an optical modulator, e.g. an advanced optical modulator that comprises two I/O modulators for each of two orthogonal polarization directions the output signals of which are combined in a polarization combiner, and all functions of a coherent optical receiver that e.g. comprises a polarization splitter and two 90° hybrids. In addition to all-optical components, such a PIC may further comprise optical-to-electrical converters like photodiodes. Especially, the PIC may comprise a number of photodiodes that convert the optical output signals of the optical components of the coherent optical receiver into a respective number of electrical receive signals $S_{RXi,1}$ and $S_{RXi,r}$ ($1 \leq i \leq K$; and K being the number of optical transmitter modules 108; the indices l, r indicating the existence of the respective signal on the left or right side of the optical paths, i.e. in the multiple optical receiver device 102 or 104, respectively), which are further processed by a digital signal processing unit 114.

As apparent from FIG. 1, a separate digital signal processing unit 114 is provided for each optical transceiver module 108. The one or more electrical receive signals $S_{RXi,1}$, $S_{RXi,r}$ created by the coherent optical receiver 112 of each optical transceiver module 108 are supplied to the respective digital signal processing unit 114, which is configured to extract the information included in the respective one or more electrical receive signals $S_{RXi,1}$, $S_{RXi,r}$. Each digital signal processing unit 114 may be configured to create an electrical or optical data receive signal $R_{i,l}$, $R_{i,r}$, which includes the information of the one or more electrical receive signals $S_{RXi,l}$, $S_{RXi,r}$ and which may be further processed and/or transmitted to another transmission device (not shown). Alternatively, a single digital signal processing unit may be used to process electrical signals transmitted to, and received from more than one PIC.

Each optical transceiver module may further comprise, in addition to the true optical components, electrical drivers (as part of the optical modulator) that receive one or more electrical modulation signals $M_{1,l}$, $M_{1,r}$ which are created by the respective digital signal processing unit 114 according to information included in an optical or electrical data transmit signal supplied to the respective digital signal processing unit 114.

As shown in FIG. 1, each coherent optical transceiver module, each PIC, has an input port 108a which is connected to an input port of a polarization-maintaining 1×2 optical power splitter 124. One of the output ports is connected to an input port of the respective optical modulator 110. The other output port is connected to a local oscillator port of the respective coherent optical receiver 112.

Each multiple optical transceiver 102, 104 additionally comprises two optical CW sources 116, 118, e.g. narrowband lasers (of course, tunable lasers may be used in order to obtain a desired flexibility with respect to the wavelengths of the CW signals created), which are configured to create optical CW signals $S_{CW1}$, $S_{CW2}$ having differing center wavelengths $\lambda_1$, $\lambda_2$ and a predetermined spectral distance between the center wavelengths. As the optical CW sources 116, 118 are used for creating optical transmit signals carrying information that may be extracted by using coherent detection, the spectral width of the optical CW signals must be sufficiently narrow (e.g. in the range of a few GHz). The center wavelength of the CW signals may be for example in the range of 1450 nm to 1600 nm. The spectral distance between the center wavelengths $\lambda_1$, $\lambda_2$ is chosen such that the spectra do not overlap (even if the optical CW signals are modulated with a high-speed information signal). Typically, the spectral distance may lie in the range of a standard WDM grid. This makes it possible to use standard WDM components such as arrayed waveguide grating in order to separate the optical paths of optical transmit signals having different wavelengths and traveling over the same optical path in opposite directions (i.e. single fiber working is used to transmit the respective optical transmit signals that are used to establish a bidirectional communication link).

In order to simplify the representation of the embodiments in the Figures, it is assumed that optical CW sources having exactly the same wavelengths are used on both sides of the optical paths 106, i.e. in the multiple optical transceiver devices 102 and 104, respectively. Those skilled in the art will of course note that instead of pairs of optical CW signals having identical wavelengths slightly differing wavelengths might be used, wherein the wavelength of an optical CW signal created at one side of the optical paths differs from the wavelength of an optical CW signal created at the other side of the optical paths by such an amount that a coherent detection is still enabled by mixing an optical transmit signal at one of these wavelengths with an optical local oscillator signal (i.e. a multiplexed optical CW signal $S_{CW}$) which at least comprises a signal portion at the other of these wavelengths.

Each optical CW source is connected to an input port of a preferably polarization-maintaining optical 2×3 coupler 120, which is configured to output, at each of the three output ports, a multiplexed optical CW signal $S_{CW}$ which comprises a predetermined portion of the optical power of each of the two optical CW input signals $S_{CW1}$, $S_{CW2}$. The optical 2×3 coupler 120 is preferably configured in such a way that essentially the same power portions of each of the two optical CW input signals $S_{CW1}$, $S_{CW2}$ are output at each of the three output ports.

Thus, the separate single-wavelength optical CW sources 116, 118 and the optical 2×3 coupler 120 form an optical CW source 119 which creates and outputs, at each output port of the optical coupler 120, a multiplexed optical CW signal $S_{CW}$ comprising in its optical spectrum a peak at each of the optical wavelengths $\lambda_1$ and $\lambda_2$. It is, however, also possible to create the desired multiplexed optical CW signal $S_{CW}$ using any other type of optical CW source. For example, the optical CW source 119 may be realized by using an optical comb source (not shown), i.e. an optical source which is configured to directly create the multiplexed optical CW signal, and to split this directly created multiplexed optical CW signal by means of a 1×3 optical power splitter that is connected to an output port of the optical comb source. Such a single optical CW source which is configured to create the multiplexed optical CW signal $S_{CW}$ may of course also be used in connection with the further embodiments described below.

As shown in FIG. 1, an optical path separating and filtering device 122 is provided at each side of each of the optical paths. Each optical path separating and filtering device 122 comprises a first 122a and a second 122b separating port and a combining port 122c. Each combining port is connected to a respective end of the optical path 106.

Each of the first separating ports is connected to a transmit port of the respective coherent optical receiver module 108, which is connected to or defined by an output port of the respective optical modulator 110. Each of the second separating ports is connected to a receiving port of the respective coherent optical receiver module 108, which is connected to or defined by a receiving port of the respective coherent optical receiver 110.

Each optical path separating and filtering device 122 is configured to route the signal that is received at the first separating port 122a to the combining port 122c and to route a signal received at the combining port 122c to the second separating port 122b. In addition, each optical path separating and filtering device 122 is configured to filter a modulated optical signal $S_{Mi,l}$, $S_{Mi,r}$, which comprises modulated signal portions at each of both wavelengths $\lambda_1$, $\lambda_2$, in such a way that the signal portion at only one of these wavelengths remains in an optical transmit signal $S_{TXi,l}$, $S_{TXi,r}$ that is output at the combining port 122c.

In order to ensure that the optical paths of the optical transmit signals $S_{TX1,l}$, $S_{TXi,r}$ that are transmitted over the same optical path 106 in opposite directions can be separated from each other without requiring optical circulators, the corresponding pairs of optical signals $S_{TX1,l}$, $S_{TX1,r}$; $S_{TX2,l}$, $S_{TX2,r}$, $S_{TX3,l}$, $S_{TX3,r}$ are created in such a way that the optical signals of each pair comprise signal portions at different wavelengths $\lambda_1$, $\lambda_2$ only. This requires that the optical path separating and filtering devices 122 provided at both ends of each optical path 106 are configured or operated in such a way that the optical transmit signal $S_{TXi,l}$ supplied to the optical path at the left end thereof has a wavelength differing from the wavelength of the optical transmit signal $S_{TXi,r}$ that is supplied to the optical path 106 at the right end thereof.

Of course, all optical path separating and filtering devices 122 provided at one side of the optical paths 106 may be integrated into a single optical component or realized as a single optical device consisting of one or more optical components. It is also possible to integrate the optical path separating and filtering devices 122 or a respective single device into the respective multiple optical transceiver device 102, 104.

In the following, the function of the coherent optical transmission system 100 shown in FIG. 1 will be explained in more detail.

The coherent optical transmission system 100 is capable of establishing three bidirectional communication links between each side of the optical paths 106, each of the communication links using a dedicated optical path 106.

As described above, each of the optical CW signals $S_{CW1}$, $S_{CW2}$ is supplied to a respective input port of the optical 2×3 coupler, which outputs, at each output port, a combined or multiplexed optical CW signal $S_{CW}$ having components corresponding to each of the optical CW signals $S_{CW1}$, $S_{CW2}$. Each of the optical CW signals $S_{CW}$ is supplied to the input port 108a of one of the PICs, i.e. one of the optical transceiver modules 108. The respective 1×2 power splitter supplies a power portion of the multiplexed optical CW signal $S_{CW}$ that is received at the respective input port to the input port of the respective optical modulator 110 and another power portion to the local oscillator port of the respective coherent optical receiver 112.

Each optical modulator 108 receives, at its modulation port, the one or more modulation signals $M_{i,l}$, $M_{i,r}$ which are created by the digital signal processing unit 114 on the basis of the respective data transmit signal $S_{i,l}$, $S_{i,r}$ and modulates the multiplexed optical CW signal $S_cw$ accordingly. The respective modulated optical signal $S_{Mi,l}$, $S_{Mi,r}$ is output at the output port of the optical modulator 110 and the output port of the PIC, respectively, and supplied to the first separating port 122a of the respective optical path separating and filtering device 122. The optical path separating and filtering device 122 creates an optical transmit signal $S_{TXi,l}$, $S_{TXi,r}$ by routing the multiplexed signal $S_{CW}$ to its combination port 122c and simultaneously filters this signal in such a way that only a single wavelength component remains within the optical transmit signal $S_{TXi,l}$, $S_{TXi,r}$.

The respective optical transmit signal $S_{TXi,l}$, $S_{TXi,r}$ is transmitted over the respective optical path 106 and supplied to the combining port 122c of the optical path separating and filtering device 122 that is connected to the opposite end of the optical path 106. Due to the routing and filtering properties of this optical path separating and filtering device 122, the optical transmit signal $S_{TXi,l}$, $S_{TXi,r}$ is output at the second separating port 122b and thus supplied to the receiving port of the respective optical transceiver module 108 and the receiving port of the coherent optical receiver 112. The coherent optical receiver 112 creates the respective one or more electrical receive signals $S_{RXi,r}$, $S_{RXi,l}$, which are supplied to the digital signal processing unit 114. The digital signal processing unit 114 processes the respective one or more electrical receive signals $S_{RXi,r}$, $S_{RXi,l}$ and creates the respective (electrical or optical) data receive signal, which ideally contains all the information included in the respective data transmit signal $S_{i,l}$, $S_{i,r}$ supplied to the respective other end of the transmission link.

As already explained above, the optical path separating and filtering devices 122 provided at both opposite ends of each optical path 106 are configured in such a way that the signals travelling in opposite directions over the same path have differing wavelengths. As shown in FIG. 1, the optical transmit signals $S_{TXi,l}$ which are transmitted from the left to the right end have the wavelength $\lambda_1$ and the optical transmit signals $S_{TXi,r}$ which are transmitted from the right to the left end have the wavelength $\lambda_2$. It would of course also be possible to use a different wavelength assignment on at least one of the optical paths 106.

The optical path separating and filtering devices 122 may be realized by an 1×2 AWG (or any 1×n AWG, wherein n−2 channel ports remain unused) if the wavelengths of the optical CW signals have a spectral distance corresponding to a multiple of the spectral distance of two adjacent AWG channels. AWGs having an identical design may be used as optical path separating and filtering devices 122 on both sides of an optical path 106 if the first and second separating ports are assigned to appropriate port channel ports of the AWG, i.e. the channel ports that route signals at the respective wavelengths $\lambda_1$, $\lambda_2$ to the combination (multiplex) port of the AWG. However, as already mentioned above, there is a plurality of other alternatives to realize the optical path separating and filtering devices 122 shown in FIG. 1 or a combined optical path separating and filtering device realizing the optical functions thereof. For example, a narrow-band optical bandpass filter that blocks all wavelengths but the respective desired wavelength may be used in order to create the optical transmit signals $S_{TXi,l}$, $S_{TXi,r}$. An optical diplexer may then be used to combine/separate the optical paths of the optical transmit signals that are transmitted over the same path in opposite directions.

It shall further be mentioned that the embodiment shown in FIG. 1 may be modified by reducing the number of optical paths to only two optical paths or to increase the number of optical paths to four or more optical paths. In all such embodiments, the number of optical transceiver modules corresponds to the number of optical paths.

It is apparent from the structure and functionalities of the optical transmission system according to FIG. 1 described above that in case of an interruption of one of the bidirectional communication links, e.g. caused by a fiber break in one of the optical paths 106, the respective data transmit signals $S_{i,r}$ and $S_{i,l}$ and the respective data receive signals $R_{i,r}$ and $R_{i,l}$ may be transmitted using another one of the three communication links. If this other communication link is already in use, i.e. respective data transmit signals $S_{j,r}$ and $S_{j,l}$ and the respective data receive signals $R_{j,r}$ and $R_{j,l}$ are transmitted over this transmission link, the data transmit and receive signals may be evaluated with respect to the priority and the data transmit and receive signals having the lower priority may be dropped.

In a further embodiment not shown in the Figures, only two communication links may be provided, wherein each multiple optical transceiver device 102, 104 differs from the embodiment shown in FIG. 1 in that only two optical transceiver modules 108, two digital processing units 114 and two optical path separating and filtering devices 122 are provided and that instead of an optical 2×3 coupler an optical 2×2 coupler is used. In such an embodiment, one of the bidirectional communication links may serve as a working communication link and the other communication link may serve as a protection communication link. The protection communication link may be unused as long as the working communication link is in order and no failure in the communication link occurs, e.g. a fiber break in the respective optical path 106 or a failure in any other component of this link (failure in the respective digital processing device 114 or in the respective optical transceiver module 108).

In order to switch from the working mode to the protection mode, the digital signal processing units 114 may be configured to communicate with each other and to supply the respective data transmit signal to the respective other digital signal processing unit 114 (this is indicated by the dotted line between the two upper digital signal processing units in FIG. 1). That is the digital signals processing units 114 also realize control function that enables the multiple optical transceiver devices 102, 104 to switch from a working mode to a protection mode) It is of course also possible to provide a separate control unit that controls the digital processing units 114 in an appropriate manner. The separate control unit or one or all of the digital processing units 114 may also be configured to detect a failure in one or more transmission (communication) links and to switch from the working mode to the protection mode in case a failure in at least one communication link is detected (and to switch from the protection mode to the working mode in case an existing failure in at least one communication link has been remedied.

Figure 2:
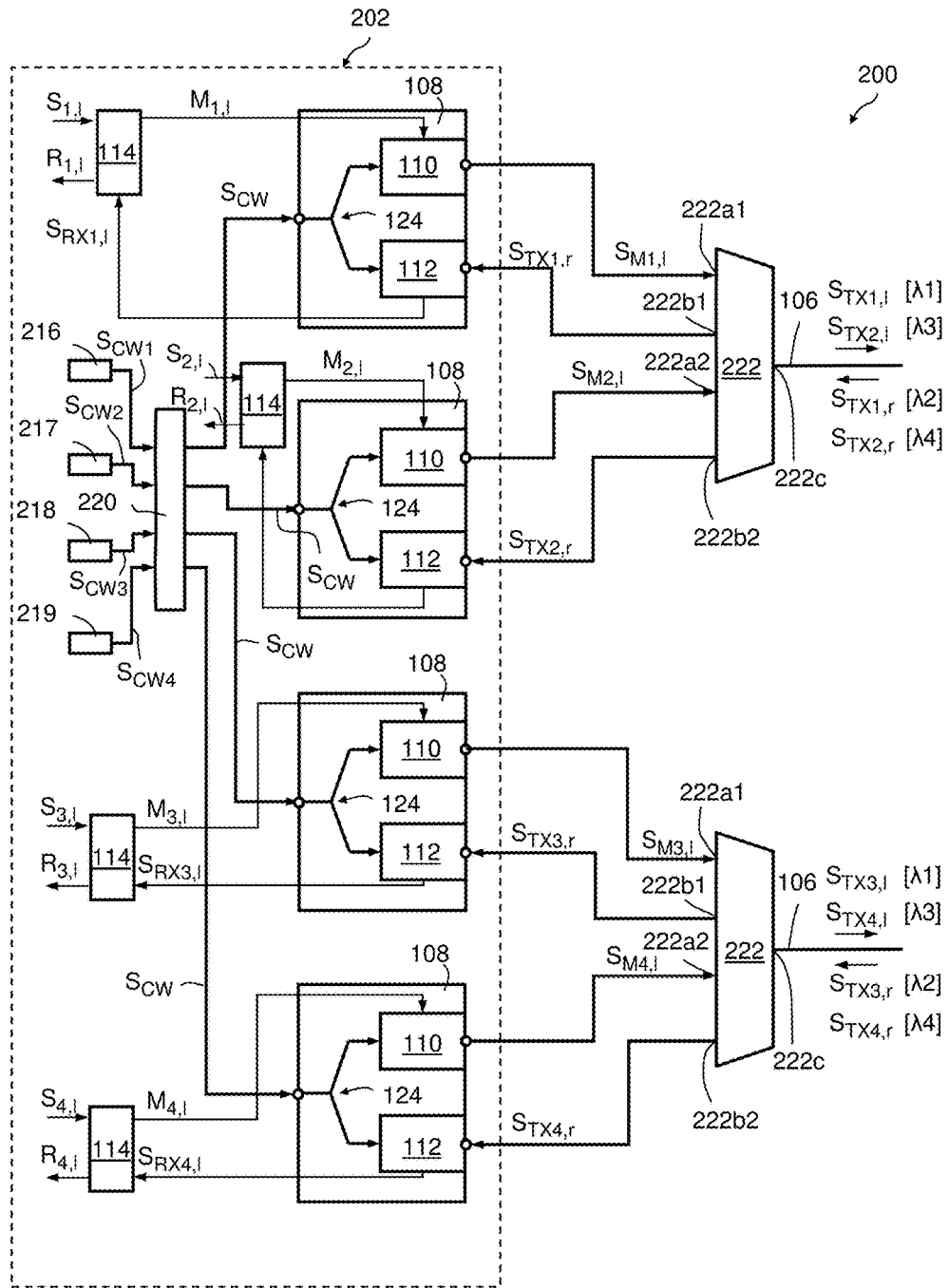
FIG. 2 shows a schematic block diagram of a multiple optical transceiver device of a second embodiment of an optical transmission system according to the invention comprising a multiple optical transceiver device comprising four optical CW sources and four optical transceiver modules at both sides of two optical paths.

FIG. 2 shows another embodiment of a coherent optical transmission system 200 comprising a multiple optical transceiver device at each side of two optical paths. In order to simplify the representation, only one of the multiple optical transceiver devices, namely, a multiple optical transceiver device 202 provided at the left side of the two optical paths 106 is shown in FIG. 2. The optical transceiver device that is provided at the right side of the two optical paths has an identical structure and functionality. The main difference between the two multiple optical transceiver devices is that the signals created at each side of the optical paths 106 include different information. Further, as already explained in connection with the embodiment according to FIG. 1, the optical transmit signals created at each side of the optical paths have differing wavelengths.

In order to simplify the following description, the components of and the signals present in the embodiment according to FIG. 2 having the same or substantially the same function as respective components already explained in connection with the embodiment shown in FIG. 1 are designated by the same reference signs. Further, in the following, only the main differences of the embodiment according to FIG. 1 as compared to the embodiment shown in FIG. 2 will be described.

As apparent from FIG. 2, the multiple optical transceiver device 202 provided at the left side of the optical paths 106 comprises four optical transceiver modules 108 each of which is connected to a dedicated digital signal processor unit 114. Four optical CW sources 216, 217, 218 and 219 are comprised by the multiple optical transceiver device 202, which create four optical CW signals $S_{CW1}$, $S_{CW2}$, $S_{CW3}$ and $S_{CW4}$, respectively.

Each of the optical CW signals $S_{CW1}$, $S_{CW2}$, $S_{CW3}$ and $S_{CW4}$ is supplied to an input port of a preferably polarization maintaining optical 4×4 coupler 220, which is configured to output, at each of four output ports, a combined or multiplexed optical CW signal $S_{CW}$. The multiplexed optical CW signal $S_{CW}$ comprises the wavelength components of each of the four optical CW signals $S_{CW1}$, $S_{CW2}$, $S_{CW3}$ and $S_{CW4}$ with a predetermined (e.g. essentially equal) power portion. The multiplexed optical CW signal is supplied to each input port of the optical transceiver modules 108. Each of the optical transceiver modules creates a modulated optical signal $S_{Mi,l}$ (in this embodiment the maximum value K for the index i, which corresponds to the number of optical transceiver modules 108, is equal to four, i.e. 1≤i≤4).

Unlike the embodiment shown in FIG. 1, the multiple optical transceiver device 202 comprises optical path separating and filtering devices 222 having two pairs of a first and a second separating port (first pair: separating ports 222a1, 222b1; second pair: separating ports 222a2, 222b2) and one combining or multiplexing port 222c.

As in case of the embodiment shown in FIG. 1, each first separating port of each pair receives the respective modulated signal $S_{Mi,l}$ created by the respective optical transceiver module 108 and routes this signal to the combining or multiplexing port of the optical path routing and filtering device 222. As explained above, each modulated signal $S_{Mi,l}$ is simultaneously optically filtered in such a way that only a single wavelength component is supplied to the respective combining port 222c, wherein a respective optical transmit signal $S_{TXi,l}$ is created.

As apparent from FIG. 2, the optical transmit signals $S_{TX1,l}$ and $S_{TX2,l}$ which are supplied to the first (upper) optical path 106 are created in such a way that the optical transmit signal $S_{TX1,l}$ comprises the wavelength $\lambda_1$ only and the optical transmit signal $S_{TX2,l}$ comprises the wavelength $\lambda_3$ only. Likewise, the optical transmit signals $S_{TX3,l}$ and $S_{TX4,l}$ which are supplied to the second (lower) optical path 106 are created in such a way that the optical transmit signal $S_{TX3,l}$ comprises the wavelength $\lambda_1$ only and the optical transmit signal $S_{TX4,l}$ comprises the wavelength $\lambda_3$ only.

If the wavelengths $\lambda_1$ to $\lambda_4$ are neighboring channel wavelengths of a WDM grid, especially a DWDM grid, stripping one channel between the two wavelengths of the optical transmit signals $S_{TXi,l}$ that are transmitted in the same direction mitigates or completely avoids crosstalk between these signals. The optical transmit signals created at the right side of the optical path by a corresponding multiple optical transceiver device (not shown) are designated by the reference signs $S_{TXi,r}$ as in case of the embodiment shown in FIG. 1. As apparent from FIG. 2, the optical transmit signals $S_{TX1,r}$ and $S_{TX2,r}$, which are transmitted in the opposite direction, i.e. in the direction from right to left, are created at the wavelengths $\lambda_2$ and $\lambda_4$, respectively. Thus, a first communication link that uses the upper optical path 106 is established by the optical transmit signals $S_{TX1,l}$ and $S_{TX1,r}$ at the neighboring wavelengths $\lambda_1$ and $\lambda_2$, respectively. A second communication link that uses the upper optical path 106 is established by the optical transmit signals $S_{TX2,l}$ and $S_{TX2,r}$ at the neighboring wavelengths $\lambda_3$ and $\lambda_4$, respectively.

Likewise, a first communication link that uses the lower optical path 106 is established by the optical transmit signals $S_{TX3,l}$ and $S_{TX3,r}$ at the neighboring wavelengths $\lambda_1$ and $\lambda_2$ and a second communication link that uses the lower optical path 106 is established by the optical transmit signals $S_{TX4,l}$ and $S_{TX4,r}$ at the neighboring wavelengths $\lambda_3$ and $\lambda_4$.

It would of course also be possible to use any other combination of wavelengths for creating the optical transmit signals $S_{TXi,l}$ and $S_{TXi,r}$ as long as all optical transmit signals traveling in the same direction have differing wavelengths and each pair of optical transmit signals, which is used to establish a communication link (using the same optical path), comprises optical transmit signals having different wavelengths.

As already mentioned above, it is not required that both signals of each communication link are created or received by means of the same optical transceiver module 108 as each optical transceiver module 108 is capable of creating a modulated signal comprising components of all CW wavelengths, wherein each component includes the full information of the respective data transmit signal, and to receive a transmit signal at any of the wavelengths of the optical CW sources.

As explained above in connection with the embodiment according to FIG. 1, an optical transmission system comprising two multiple optical transceiver devices according to FIG. 2 may also be configured in such a way that path protection (strictly speaking, full transmission link or communication link protection) is achieved.

It shall be noted that the embodiments shown in FIGS. 1 and 2 represent specific examples of the invention only. Generally, any arbitrary number of optical sources creating CW signals having different wavelengths may be used in connection with any arbitrary number of optical transceiver modules. Of course, the maximum number of optical paths is determined by the number of optical transceiver modules. In case the number of optical ports corresponds to the number of optical transceiver modules, only a single pair of optical transmit signals is transmitted over each optical path. In case the number of optical paths is smaller than the number of optical channel transceiver modules, wavelength multiplex is used for the transmission over at least one of the optical paths.

It would of course also be possible to use such optical transceiver module configuration with multiplexed CW sources in other applications in which transmit and receive signals are at differing wavelengths. This could be for example drop-and-continue for multicast applications with add/drop nodes. In these, power splitters are used to drop the same signal at multiple locations. The signal added at each of these nodes either in the same direction, or in opposite direction to the multicast signal has to use a different wavelength. Hence, there is the need to have an optical transceiver module which uses different transmit and receive wavelengths.

Figure 3:
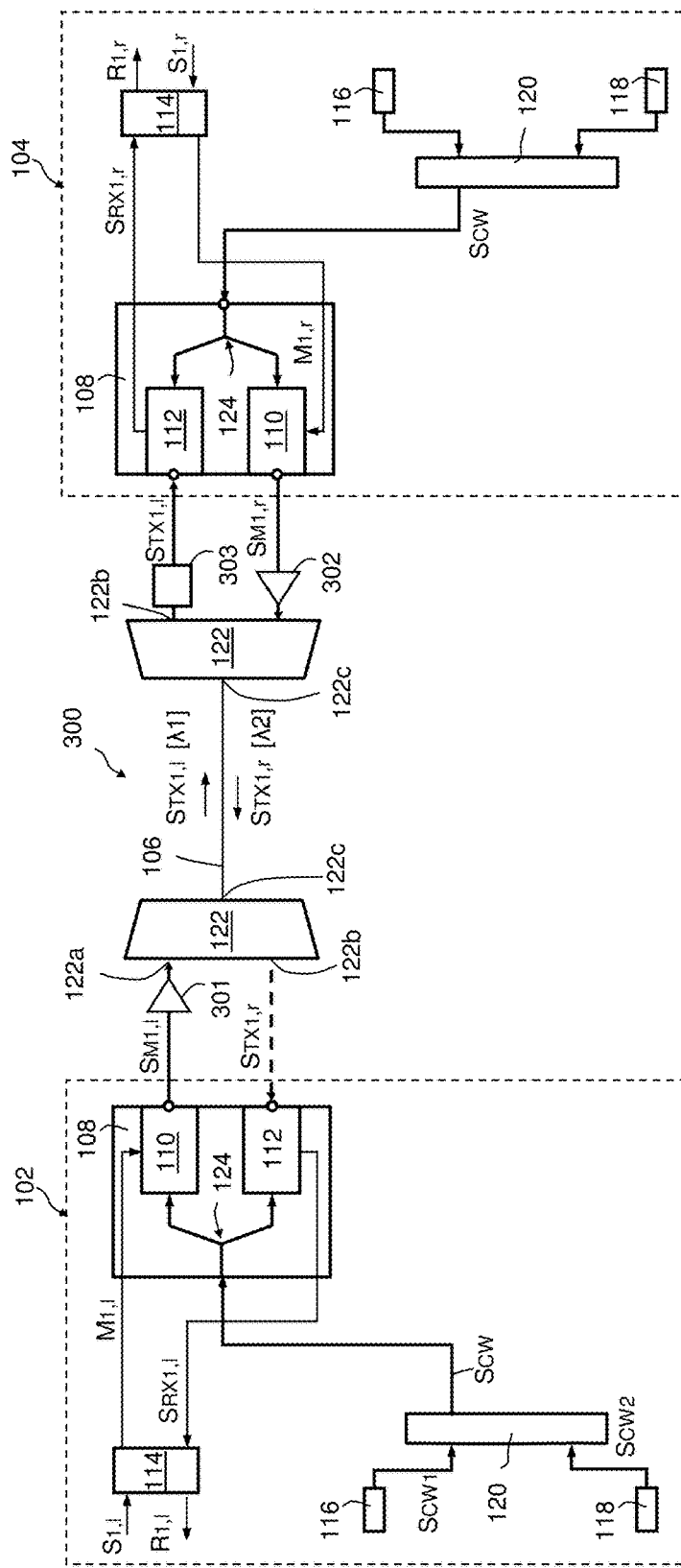
FIG. 3 shows a schematic block diagram of a proof-of-concept transmission system similar to the optical transmission system in FIG. 1.

The inventors have successfully experimentally verified the operation in a proof-of-concept experiment as depicted in FIG. 3. Identical reference signs as for the optical transmission system 100 shown in FIG. 1 are used for identical components/signals for the proof-of-concept transmission system 300 in FIG. 3 that comprises a single optical path 106 only. The set-up transmission system 300 is in accordance with the optical transmission system shown in FIG. 1, but comprises only one optical path 106 in order to compare the system performance between the case of a regular unidirectional operation in which only a single optical CW source (e.g. a CW-laser) 116 or 118 at a single wavelength $\lambda_1$ or $\lambda_2$ is used at the respective transceiver device 102 or 104, to the case of a bidirectional operation in which both optical sources 116 and 118 (e.g. CW-lasers) at both wavelengths $\lambda_1$ and $\lambda_2$ are used at both transceiver devices 102, 104. Of course, as in this proof-of-concept set-up 300 only a single optical path 106 is used, the "multiple" optical transceiver devices 102, 104 comprise a single optical transceiver module 108 only. For a detailed description of the proof-of-concept transmission system 300, reference is made to the above description of the optical transmission system 100 depicted in FIG. 1.

The wavelengths $\lambda_1$, $\lambda_2$ of the two CW-lasers creating the optical CW signals $S_{CW1}$, $S_{CW2}$ were set to wavelengths corresponding to optical frequencies of 193.4 THz and 193.5 THz. In the optical paths of the modulated optical signals $S_{M1,l}$ and $S_{M1,r}$ erbium-doped amplifiers (EDFA) 301, 302 were added to compensate for insertion losses. Two optical arrayed-waveguide gratings (AWGs) with 50-GHz channel spacing were used as optical separating and filtering devices 122 and were directly connected with each other using a fiber patch cord realizing the optical path 106. Between the second AWG 122 and the input port 108a of the optical transceiver module an optical device which is referred to as noise-loading stage 303 was added which allows to vary the optical signal-to-noise ratio (OSNR) of the signal $S_{TX1,l}$. In the first case with only a single CW-laser, the second lasers 118 creating the signal $S_{CW2}$ (at both sides, i.e. at the transceiver devices 102 and 104) and EDFA 302 were switched off. The optical transmit signal $S_{TX1,l}$ generated at the transceiver device 102 was received at the transceiver device 104 and evaluated by bit-error ratio measurements for different OSNRs. The transceiver devices 102, 104 were configured to generate and receive 200-Gb/s polarization-division multiplexed (PDM) 16-ary quadrature-amplitude modulated (16QAM) signals.

Figure 4:
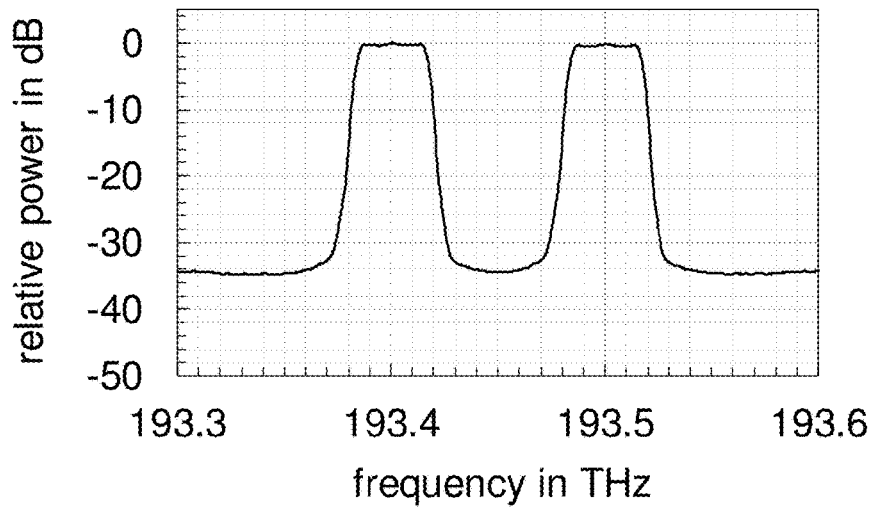
FIG. 4 shows the optical spectrum of the modulated optical signal measured at the first separating or input port of the AWG at the left side of the system in FIG. 3.
Figure 5:
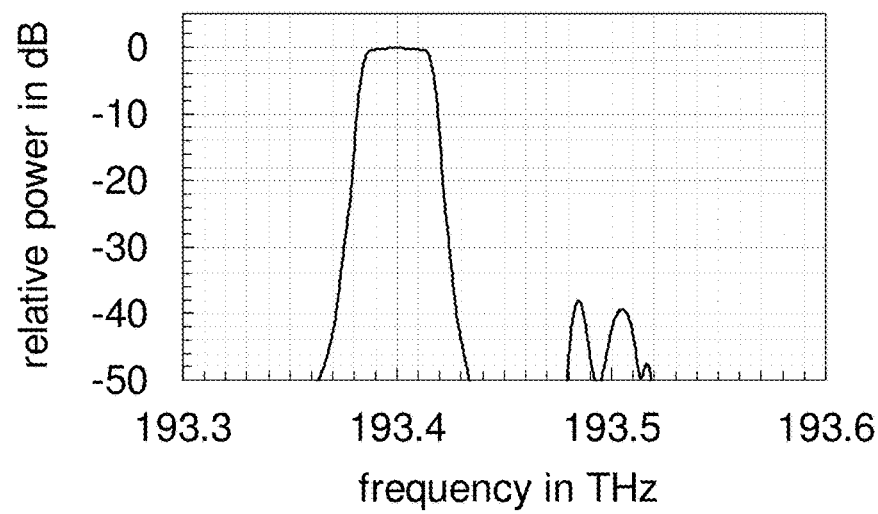
FIG. 5 shows the optical spectrum of the optical transmit signal at the combining port or output port of the AWG at the left side of the system in FIG. 3.
Figure 6:
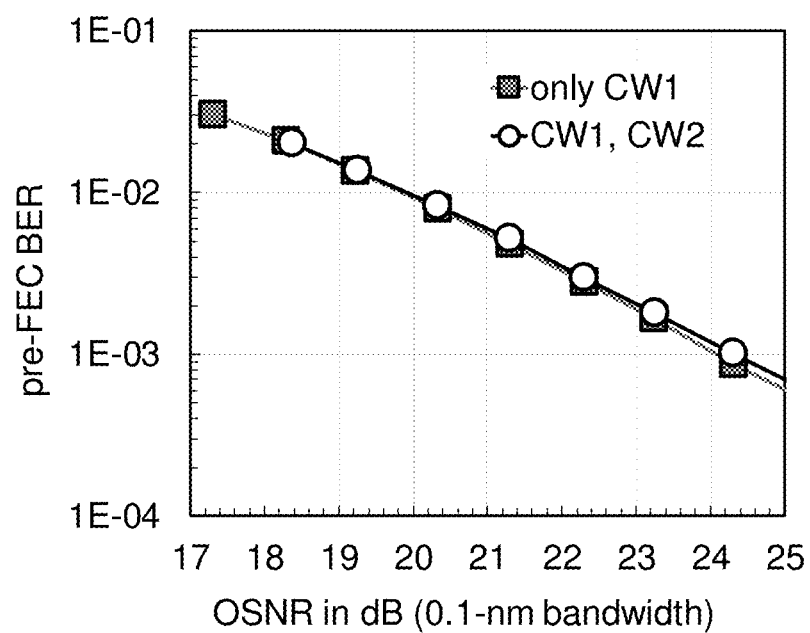
FIG. 6 shows a graph including curves for the pre-FEC BER depending on the OSNR in case of a unidirectional transmission using a single optical CW source and a bidirectional transmission over the single optical path using both optical CW sources.

FIG. 4 shows the optical spectrum of the modulated optical signal $S_{M1,l}$ measured at the first separating port 122a of the AWG 122 at the respective transmission side (left side in FIG. 3) with the modulation signal $M_{1,l}$ modulated on the two wavelengths of the two CW-lasers 116, 118. FIG. 5 shows the optical spectrum of the optical transmit signal $S_{TX1,l}$ at the combining port 122c of the same AWG 122 with the second wavelength suppressed. FIG. 6 shows the graph with the results for the two cases as "only CW1" and "CW1, CW2". The pre-FEC BER versus OSNR is shown, which is the bit error ratio before forward-error correction (FEC). The OSNR is measured in a 0.1-nm reference bandwidth. The observed negligible difference between both curves shows that close to identical system performance can be achieved in the configuration. That is, using additional wavelengths for both the creation of an optical transmit signal and the local oscillator signal in a standard optical transceiver module that may be realized as a PIC does not deteriorate the system performance in an unacceptable manner.

LIST OF REFERENCE SIGNS 100 optical transmission system
102 multiple optical transceiver device
104 multiple optical transceiver device
$106_i$ optical path ($1 \leq i \leq 3$)
108 optical transceiver module
108a input port
110 optical modulator
112 coherent optical receiver
114 digital signal processing unit
116 optical CW source, e.g. narrowband laser ($\lambda_1$)
118 optical CW source, e.g. narrowband laser ($\lambda_2$)
119 optical CW source (creating the multiplexed optical CW signal)
120 optical 2×3 coupler
122 optical separating and filtering device
122a first separating port
122b second separating port
122c combining port
124 1×2 optical power splitter
200 optical transmission system
202 multiple optical transceiver device
216 optical CW source, e.g. narrowband laser ($\lambda_1$)
217 optical CW source, e.g. narrowband laser ($\lambda_2$)
218 optical CW source, e.g. narrowband laser ($\lambda_3$)
219 optical CW source, e.g. narrowband laser ($\lambda_4$)
220 optical 4×4 coupler
222 path separating and filtering device
222a1 first separating port
222a2 first separating port
222b1 second separating port
222b2 second separating port
222c combination (multiplexing) port
300 proof-of-concept transmission system
301 erbium doped amplifier
302 erbium doped amplifier
303 noise-loading stage
K number or optical transceiver modules/number of various signals to and from the optical transceiver modules
$M_{i,r}$ one or more (electrical) modulation signals ($1 \leq i \leq K$), right side of optical paths
$M_{i,l}$ one or more (electrical) modulation signals ($1 \leq i \leq K$), left side of optical paths
$R_{i,r}$ (electrical or optical) data receive signal ($1 \leq i \leq K$), right side of optical paths
$R_{i,l}$ (electrical or optical) data receive signal ($1 \leq i \leq K$), left side of optical paths
$S_{CW1}$ optical CW signal ($\lambda_1$)
$S_{CW2}$ optical CW signal ($\lambda_2$)
$S_{CW3}$ optical CW signal ($\lambda_3$)
$S_{CW4}$ optical CW signal ($\lambda_4$)
$S_{CW}$ combined (multiplexed) optical CW signal ($\lambda_1$ and $\lambda_2$; $\lambda_1$ to $\lambda_4$)
$S_{i,r}$ (electrical or optical) data transmit signal(s) ($1 \leq i \leq K$), right side of optical paths
$S_{i,l}$ (electrical or optical) data transmit signal(s) ($1 \leq i \leq K$), left side of optical paths
$S_{Mi,r}$ modulated optical signal ($1 \leq i \leq K$), right side of optical paths
$S_{Mi,l}$ modulated optical signal ($1 \leq i \leq K$), left side of optical paths
$S_{RXi,r}$ (one or more) electrical receive signal(s), right side of optical paths ($1 \leq i \leq K$; K being the number of optical transceiver modules 108)
$S_{RXi,l}$ (one or more) electrical receive signal(s), left side of optical paths ($1 \leq i \leq K$; K being the number of optical transceiver modules 108)
$S_{TXi,r}$ optical transmit signal ($1 \leq i \leq K$), right side of optical paths
$S_{TXi,l}$ optical transmit signal ($1 \leq i \leq K$), left side of optical paths

The invention claimed is:

1. A method for establishing at least two bidirectional communication links using coherent detection, the method comprising the steps of
    (a) providing, at each of a first and a second side of at least a first and a second optical path, at least two optical transceiver modules, wherein each optical transceiver module comprises an optical modulator and a coherent optical receiver, each optical modulator having an input port, a modulation port and an output port and each coherent optical receiver having a local oscillator port, a receiving port and an output port, wherein an input port of each optical transceiver module is connected by an optical 1×2 power splitter device to the optical modulator input port and the coherent optical receiver input port,
    (b) creating, at each of the first and second sides of the optical paths, a multiplexed optical continuous-wave (CW) signal comprising at least two optical CW signals having differing wavelengths, wherein the CW signals created at the first side and the CW signals created at the second side have the same or approximately the same wavelengths,
    (c) supplying the multiplexed optical CW signal to the input port of each optical transceiver module,
    (d) creating, at an output port of each optical modulator, which defines an output port of the optical transceiver module, a modulated optical signal which includes information of one or more modulation signals that are supplied to the modulation port of the corresponding optical modulator,
    (e) creating, at each of the first and second sides of the optical paths, at least two first and second optical transmit signals by optically filtering each of the modulated optical signals in such a way that only a single wavelength remains, and routing each at least one pair of a dedicated first and second optical transmit signal that is used to establish the at least two bidirectional communication links to a dedicated one of the at least first and second optical paths, wherein the first and second optical transmit signals of each pair have differing wavelengths and wherein the first and second optical transmit signals that are transmitted in the same direction over the same optical paths have differing wavelengths,
    (f) routing, at each of the first and second sides of the optical paths, each of the at least two first and second optical transmit signals to a receiving port of a dedicated coherent optical receiver, and
    (g) creating, at the output port of each coherent optical receiver, one or more electrical receive signals by mixing the respective optical transmit signal that is supplied to the receiving port and the multiplexed optical CW signal.

2. The method according to claim 1, wherein a data receive signal is created by processing the one or more receive signals in such a way that signal components caused by mixing the optical transmit signal with optical CW signals having different wavelengths are eliminated or at least reduced in such a manner that the information included in the respective optical transmit signal is detected with a bit error rate that is below a predetermined threshold.

3. The method according to claim 1, wherein two optical paths are used and the same number of pairs of optical transmit signals having the same wavelengths is transmitted over each optical path.

4. The method according to claim 3, wherein one of the two optical paths is used as working path and the other optical path is used as a protection path so that, in case of an impairment of the transmission performance or path interruption of the working path, the bidirectional communication can be switched to the protection path.

5. The method according to claim 2, wherein two optical paths are used and the same number of pairs of optical transmit signals having the same wavelengths is transmitted over each optical path.

6. The method according to claim 5, wherein one of the two optical paths is used as working path and the other optical path is used as a protection path so that, in case of an impairment of the transmission performance or path interruption of the working path, the bidirectional communication can be switched to the protection path.

7. A multiple optical transceiver device for establishing at least two bidirectional communication links using coherent detection comprising
  (a) at least two optical transceiver modules, each comprising an optical modulator and a coherent optical receiver, each optical modulator having an input port, a modulation port and an output port and each coherent optical receiver having a local oscillator port, a receiving port and an output port, wherein an input port of each optical transceiver module is connected by an optical 1×2 power splitter device to the optical modulator input port and the coherent optical receiver input port, and
  (b) an optical continuous-wave (CW) source which is configured to create a multiplexed optical CW signal comprising at least two optical CW signals each having a wavelength differing from the wavelengths of the other optical CW signals,
  (c) wherein each optical modulator is configured to create, at the output port, a modulated optical signal which includes information of one or more modulation signals that are supplied to the modulation port by modulating a multiplexed optical CW signal that is supplied to its input port and comprises power portions of each of the optical CW signals, and
  (d) wherein each coherent optical receiver is configured to create, at the output port, one or more electrical receive signals by mixing the respective optical transmit signal that is supplied to the receiving port and the multiplexed optical CW signal.

8. The multiple optical transceiver device according to claim 7, wherein the optical source comprises separate optical CW sources for creating each of the optical CW signals and an optical power splitter device, each output port of the optical CW sources being connected to an input port of an optical power splitter device and each output port of the optical power splitter device being connected to an input port of each optical transceiver module.

9. The multiple optical transceiver device according to claim 7, wherein the multiple optical transceiver device further comprises
  (e) an optical path separating and filtering device, which is configured to connect the at least two optical transceiver modules to at least a first and a second optical path, the optical path separating and filtering device comprising, for each of the at least first and second optical paths, at least one pair of a first and a second separating port and a combining port, the combining port being connected to the respective optical path, the first separating port of each pair being connected to the output port of the modulator of a dedicated optical transceiver module and the second separating port of each pair being connected to the receiving port of the coherent optical receiver of a dedicated optical transceiver module,
  (f) wherein the optical path separating and filtering device is configured to filter and route the modulated optical signals that are received at the first separation port in such a way that a corresponding optical transmit signal comprising only a single wavelength is output only at the respective combination port, wherein, in case multiple optical transmit signals are routed to the same optical path, the respective optical transmit signals have differing wavelengths, and wherein the number of optical transmit signals that are output at each of the combination ports of each optical path separating and filtering device is equal to or less than half of the number of optical CW sources, and
  (g) wherein the optical path separating and filtering device is configured to route each of the optical transmit signals that are received at the combination ports and have a wavelength equal or essentially equal to one of the wavelengths of the optical CW sources to a respective dedicated second separating port only.

10. The multiple optical transceiver device according to claim 8, wherein one or more signal processing units are provided for processing the one or more electrical receive signals created by the at least two optical transceiver modules in order to extract the information included in the respective optical transmit signals, wherein the one or more receive signals of each optical transceiver module are processed in such a way that signal components caused by mixing the optical transmit signal with multiplexed optical CW signal having different wavelengths are eliminated or at least reduced in such a manner that the information included in the respective optical transmit signal is detected with a bit error rate that is below a predetermined threshold.

11. The multiple optical transceiver device according to claim 9, wherein the optical path separating and filtering device is configured to create a first group of optical transmit signals that are supplied to a first optical path by appropriately routing and filtering a first group of modulated optical signals created by a first group of optical transceiver modules, and a second group of optical transmit signals that are supplied to a second optical path by appropriately routing and filtering a second group of modulated optical signals created by a second group of optical transceiver modules, wherein the number of optical transmit signals that are supplied to the first optical path is equal to the number of optical transmit signals that are supplied to the second optical path and wherein the wavelengths of the first group of optical transmit signals are equal to the wavelengths of the second group of optical transmit signals.

12. The multiple optical transceiver device according to claim 9, wherein the optical path separating and filtering device comprises an arrayed waveguide grating for each optical path, each arrayed waveguide grating having a WDM port connected to the respective optical path and at least two channel ports defining the at least one pair of a first and a second separating port.

13. The multiple optical transceiver device according to claim 10, wherein a separate signal processing unit is provided for processing the one or more electrical receive signals created by each of the at least two optical transceiver modules.

14. The multiple optical transceiver device according to claim 11, wherein the multiple optical transceiver device is configured in such a way that, in a working mode, the first optical path and the first group of optical transmit signals are used for establishing the at least two bidirectional communication links and that, in a protection mode, the second optical path and the second group of optical transmit signals are used for establishing the at least two bidirectional communication links.

15. A coherent optical transmission system for establishing at least two bidirectional communication links using coherent detection comprising at least a first and a second optical path having a first and a second end, and a first and a second multiple optical transceiver device provided at the first and second ends of the first and second optical paths, respectively, each multiple optical transceiver device comprising
   (a) at least two optical transceiver modules, each comprising an optical modulator and a coherent optical receiver, each optical modulator having an input port, a modulation port and an output port and each coherent optical receiver having a local oscillator port, a receiving port and an output port, wherein an input port of each optical transceiver module is connected by an optical 1×2 power splitter device to the optical modulator input port and the coherent optical receiver input port, and
   (b) an optical continuous-wave (CW) source which is configured to create a multiplexed optical CW signal comprising at least two optical CW signals each having a wavelength differing from the wavelengths of the other optical CW signals,
   (c) wherein each optical modulator is configured to create, at the output port, a modulated optical signal which includes information of one or more modulation signals that are supplied to the modulation port by modulating a multiplexed optical CW signal that is supplied to its input port and comprises power portions of each of the optical CW signals, and
   (d) wherein each coherent optical receiver is configured to create, at the output port, one or more electrical receive signals by mixing the respective optical transmit signal that is supplied to the receiving port and the multiplexed optical CW signal,
   (e) wherein each of the first and second multiple optical transceiver devices comprises an optical path separating and filtering device, which is configured to connect the at least two optical transceiver modules to at least a first and a second optical path, the optical path separating and filtering device comprising, for each of the at least first and second optical paths, at least one pair of a first and second separating port and a combining port, the combining port being connected to the respective optical path, the first separating port of each pair being connected to the output port of the optical modulator of a dedicated optical transceiver module and the second separating port of each pair being connected to the receiving port of the coherent optical receiver of a dedicated optical transceiver module,
   (f) wherein the optical path separating and filtering device is configured to filter and route the modulated optical signals that are received at the first separation port in such a way that a corresponding optical transmit signal comprising only a single wavelength is output only at the respective combination port, wherein, in case multiple optical transmit signals are routed to the same optical path, the respective optical transmit signals have differing wavelengths, and wherein the number of optical transmit signals that are output at each of the combination ports is equal to or less than half of the number of optical CW sources, and
   (g) wherein the optical path separating and filtering device is configured to route each of the optical transmit signals that are received at the combination ports and have a wavelength equal or essentially equal to one of the wavelengths of the CW sources to a respective dedicated second separating port only.

16. The coherent optical transmission system according to claim 15, wherein the optical path separating and filtering device of each multiple optical transceiver device is configured to create a first group of optical transmit signals that are supplied to a first optical path by appropriately routing and filtering a first group of modulated optical signals created by a first group of optical transceiver modules, and a second group of optical transmit signals that are supplied to a second optical path by appropriately routing and filtering a second group of modulated optical signals created by a second group of optical transceiver modules, wherein the number of optical transmit signals that are supplied to the first optical path is equal to the number of optical transmit signals that are supplied to the second optical path and wherein the wavelengths of the first group of optical transmit signals are equal to the wavelengths of the second group of optical transmit signals.

17. The coherent optical transmission system according to claim 15, wherein each of the first and second multiple optical transceiver devices is configured in such a way that, in a working mode, the first optical path and the first group of optical transmit signals are used for establishing the at least two bidirectional communication links and that, in a protection mode, the second optical path and the second group of optical transmit signals are used for establishing the at least two bidirectional communication links.

18. The coherent optical transmission system according to claim 15, wherein each of the optical path separating and filtering devices comprises an arrayed waveguide grating for each optical path, each arrayed waveguide grating having a WDM port connected to the respective optical path and at least two channel ports defining the at least one pair of a first and second separating port.

19. The coherent optical transmission system according to claim 16, wherein each of the first and second multiple optical transceiver devices is configured in such a way that, in a working mode, the first optical path and the first group of optical transmit signals are used for establishing the at least two bidirectional communication links and that, in a protection mode, the second optical path and the second group of optical transmit signals are used for establishing the at least two bidirectional communication links.

20. The coherent optical transmission system according to claim 16, wherein each of the optical path separating and filtering devices comprises an arrayed waveguide grating for each optical path, each arrayed waveguide grating having a WDM port connected to the respective optical path and at least two channel ports defining the at least one pair of a first and second separating port.

* * * * *